United States Patent
Yamaguchi et al.

(10) Patent No.: US 9,651,411 B2
(45) Date of Patent: May 16, 2017

(54) ELECTROMAGNETIC FLOWMETER AND SELF-DIAGNOSING METHOD OF EXCITING CIRCUIT UNIT THEREOF

(71) Applicants: Yuichiro Yamaguchi, Tokyo (JP); Takashi Higuchi, Tokyo (JP); Takaki Nakamura, Tokyo (JP)

(72) Inventors: Yuichiro Yamaguchi, Tokyo (JP); Takashi Higuchi, Tokyo (JP); Takaki Nakamura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1150 days.

(21) Appl. No.: 13/724,399

(22) Filed: Dec. 21, 2012

(65) Prior Publication Data

US 2013/0289897 A1 Oct. 31, 2013

(30) Foreign Application Priority Data

Apr. 27, 2012 (JP) .................................. 2012-104133

(51) Int. Cl.
*G01F 1/00* (2006.01)
*G01F 7/00* (2006.01)
(Continued)

(52) U.S. Cl.
CPC ............... *G01F 1/588* (2013.01); *G01F 1/58* (2013.01); *G01F 1/60* (2013.01); *G06F 15/00* (2013.01)

(58) Field of Classification Search
CPC ... G01F 1/588; G01F 1/58; G01F 1/60; G06F 15/00
(Continued)

(56) References Cited

U.S. PATENT DOCUMENTS

| 4,601,209 A | | 7/1986 | Amata | |
|---|---|---|---|---|
| 4,651,286 A | * | 3/1987 | Fukai | ........................ G01F 1/60 702/45 |

(Continued)

FOREIGN PATENT DOCUMENTS

| CN | 102243087 A | 11/2011 |
|---|---|---|
| JP | 60-242318 | 12/1985 |

(Continued)

OTHER PUBLICATIONS

English translation of JP 2004-354205, Dec. 16, 2004.*

(Continued)

*Primary Examiner* — Michael Nghiem
(74) *Attorney, Agent, or Firm* — Holtz, Holtz & Volek PC

(57) ABSTRACT

An electromagnetic flowmeter using a square wave excitation method includes a differential amplifier which outputs a detection signal; an analog-digital converter which converts the detection signal into a digital detection signal; a timing control circuit which generates a sampling signal for sampling the digital detection signal; an calculation unit which executes a flow rate calculation process and a abnormality judging process at a same time. The flow rate calculation process acquires a flow velocity output signal by sampling the digital detection signal in a flat portion in a positive/negative excitation section. The abnormality judging process acquires a differential output signal by sampling the digital detection signal in a rising/falling portion in the positive/negative excitation section, and obtains a differential noise from the flow velocity output signal and a differential output signal, and judges abnormality of the exciting current by comparing a differential noise with a detection threshold level.

3 Claims, 4 Drawing Sheets

(51) Int. Cl.
*G01F 1/58* (2006.01)
*G06F 15/00* (2006.01)
*G01F 1/60* (2006.01)

(58) Field of Classification Search
USPC .......................................................... 702/45
See application file for complete search history.

(56) References Cited

U.S. PATENT DOCUMENTS

| | | | | |
|---|---|---|---|---|
| 4,969,363 | A | * | 11/1990 | Mochizuki .............. G01F 1/002 324/439 |
| 5,487,310 | A | * | 1/1996 | Higuchi .................... G01F 1/60 73/861.12 |
| 2004/0015302 | A1 | * | 1/2004 | Suzuki ...................... G01F 1/58 702/38 |
| 2007/0220993 | A1 | * | 9/2007 | Yamamoto ............... G01F 1/60 73/861.16 |
| 2009/0071264 | A1 | * | 3/2009 | Wray ...................... G01F 1/588 73/861.12 |
| 2011/0239778 | A1 | | 10/2011 | Mitsutake et al. |

FOREIGN PATENT DOCUMENTS

| | | |
|---|---|---|
| JP | 03144314 A | 6/1991 |
| JP | 06273205 A | 9/1994 |
| JP | 2004-354205 | 12/2004 |
| JP | 2011209231 A | 10/2011 |

OTHER PUBLICATIONS

Japanese Office Action (and English translation thereof) dated Dec. 4, 2015, issued in counterpart Japanese Application No. 2012-104133.

Chinese Office Action (and English translation thereof) dated Apr. 20, 2015, issued in counterpart Chinese Application No. 201310034632.5.

* cited by examiner

ELECTROMAGNETIC FLOWMETER AND SELF-DIAGNOSING METHOD OF EXCITING CIRCUIT UNIT THEREOF

CROSS-REFERENCE TO RELATED APPLICATION

This application is based upon and claims the benefit of priority from the prior Japanese Patent Application No. 2012-104133, filed on Apr. 27, 2012, the entire contents of which are incorporated herein by reference.

FIELD

An embodiment of the present invention relates to an electromagnetic flowmeter and a self-diagnosing method of an exciting circuit unit thereof.

BACKGROUND

An electromagnetic flowmeter carries a diagnostic function of detecting a abnormal state of each part thereof. As for an electromagnetic flowmeter having an exciting circuit to send an exciting current through an exciting coil, it is an especially important to detect abnormalities of the exciting current.

Conventionally, there are a 2-level excitation method, a 3-level excitation method and a remaining magnetism excitation method as an excitation method of electromagnetic flowmeter. The 2-level excitation method includes a positive excitation and a negative excitation by a constant current. As for the 3-level excitation method, a non-excitation is added to the 2-level excitation method (see JP, 2004-354205A, for example). The remaining magnetism excitation method uses an intermittent pulse excitation and realizes low power consumption less than the 3-level excitation method (see JP, 1985-242318A, for example).

Conventionally, as for an abnormality detection of exciting current, the abnormality of exciting circuit is judged by detecting a change of the exciting current with a detector circuit for exciting current provided in the exciting circuit (see JP, 2004-354205A, for example).

Generally, the abnormality detection of exciting current needs a dedicated circuit including a current detection part to detect a current which flows through the exciting circuit, as shown in JP, 2004-354205A. That is, an electromagnetic flowmeter needs composition new for the abnormality detection of exciting current.

An object of the present invention is to provide an electromagnetic flowmeter which can perform abnormality detection of exciting current with sufficient accuracy without adding new composition and a self-diagnosing method of an exciting current circuit unit thereof.

DETAILED EMBODIMENT

An electromagnetic flowmeter of an embodiment appliess a magnetic field to a fluid in a measurement pipe, processes a detection signal based on a voltage generated between a pair of electrodes which is arranged in a direction which intersects perpendicularly to a application direction of the magnetic field and which intersects perpendicularly to a tube axis of the measurement pipe, and obtains a flow rate. The electromagnetic flowmeter includes an exciting circuit unit, a differential amplifier, an analog-digital converter, a timing control circuit, and a calculation unit. The exciting circuit unit has an exciting coil which generates a magnetic field and the exciting circuit which sends a square wave exciting current through the exciting coil. The differential amplifier detects a voltage generated between a pair of electrodes and outputs a detection signal. The analog-digital converter changes the detection signal from the differential amplifier into a digital signal and outputs a digital detection signal. The timing control circuit generates an exciting synchronization signal for the exciting circuit unit, a first sampling signal for sampling a portion of the digital detection signal corresponding to a flat portion of the detection signal in a positive excitation section and to a flat portion of the detection signal in the negative excitation section, a second sampling signal for sampling a portion of the digital detection signal corresponding to a rising portion of the detection signal in a positive excitation section and to a falling portion of the detection signal in a negative excitation section. The calculation unit executes a flow rate calculation process and an abnormality judging process. The flow rate calculation process acquires a flow velocity output signal by sampling the digital detection signal based on the first sampling signal and obtains the flow rate of the fluid from the flow velocity output signal. The abnormality judging process acquires a differential output signal which contains a differential noise and a flow velocity output signal ingredient by sampling the digital detection signal based on the second sampling signal, and obtains the differential noise from the flow velocity output signal and the differential output signal, detects abnormality of the exciting current using the differential noise, and judges a failure part of the exciting circuit unit. And the calculation unit executes the flow rate calculation process and the abnormality judging process at a same time.

Hereinafter, an embodiment of the present invention is described with reference to drawings.

First Embodiment

Figure 1:
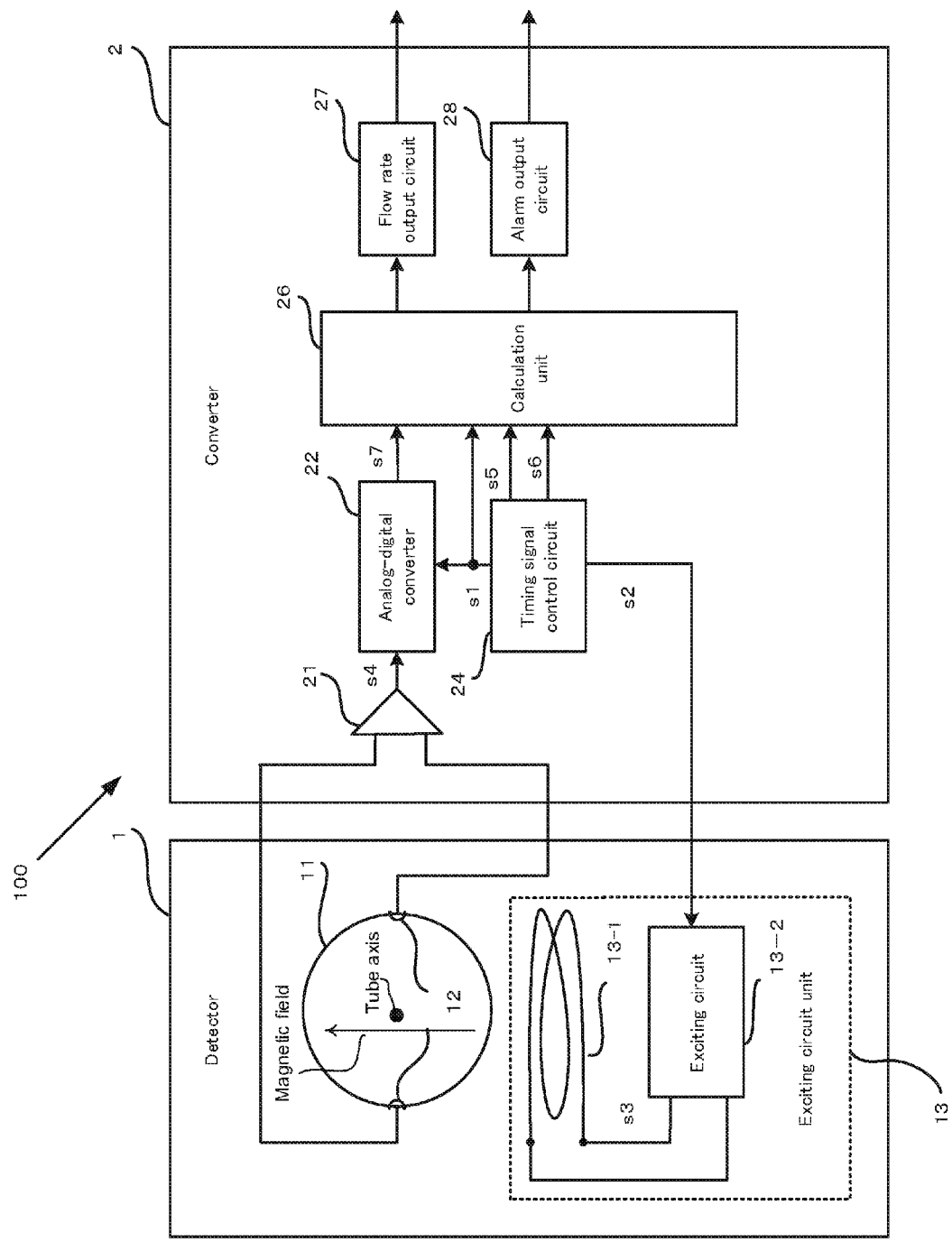
FIG. 1 is a block diagram showing a composition of an electromagnetic flowmeter of a first embodiment.

The first embodiment is described with reference to FIGS. 1 to 3. FIG. 1 is a block diagram showing a composition of an electromagnetic flowmeter of the first embodiment. The electromagnetic flowmeter 100 of the first embodiment is provided with a detector 1 and a converter 2.

The detector 1 is provided with a measurement pipe 11, a pair of electrodes 12 arranged on an inner pipe wall of the measurement pipe 11, and an exciting circuit unit 13. An arrangement direction of a pair of electrodes 12 intersects perpendicularly to a tube axis of the measurement pipe 11, and intersects perpendicularly to an application direction of a magnetic field to a fluid. The electromagnetic flowmeter 100 applies the magnetic field to the fluid in the measurement pipe 11, acquires a voltage generated between a pair of electrodes 12, and obtains a flow rate of the fluid by processing the voltage.

The exciting circuit unit 13 is provided with an exciting coil 13-1 and an exciting circuit 13-2. The exciting coil 13-1 generates the magnetic field by an exciting current. The exciting circuit 13-2 receives an exciting synchronization signal s2 from a timing control circuit 24 which is mentioned later, and generates a square wave exciting current passed in the exciting coil 13. Therefore, the exciting coil 13-1 generates the square wave magnetic field by the square wave exciting current.

The converter 2 is provided with a differential amplifier 21, an analog-digital converter 22, the timing signal control circuit 24, the calculation unit 26, a flow rate output circuit 27, and an alarm output circuit 28.

The differential amplifier 21 is connected to a pair of electrodes 12 using wiring. The differential amplifier 21 detects a voltage generated between the electrodes 12, amplifier 21 amplifies the voltage detected and outputs a detection signal s4.

The analog-digital converter 22 changes the detection signal s4 into a digital signal in synchronization with a clock signal s1, and outputs a digital detection signal s7.

The timing signal control circuit 24 generates the clock signal s1, the exciting synchronization signal s2, a sampling signal s5, and a sampling signal s6. The clock signal s1 is a signal used as a standard of processing, and is supplied to the analog-digital converter 22 and the calculation unit 26. The exciting synchronization signal s2 is supplied to the exciting circuit unit 13. The sampling signals s5, s6 are signals used for sampling the digital detection signal s7, and they are supplied to the calculation unit 26.

The sampling signal s5 is used to sample a portion of the digital detection signal s7 corresponding to a flat portion of the detection signal s4 in a positive excitation section and a flat portion of the detection signal s4 in a negative excitation section. The sampling signal s6 is used to sample a portion of the digital detection signal s7 corresponding to a rising portion of the detection signal s4 in the positive excitation section and a falling portion of the detection signal s4 in the negative excitation section.

Here, an exciting current which flows in one direction is called a positive excitation current, an exciting current which flows in another direction is called a negative excitation current, and the states of the magnetic field generated by the positive excitation current and the negative excitation current are called a positive excitation and a negative excitation, respectively.

The calculation unit 26 executes a flow rate calculation process and an abnormality judging process. The flow rate calculation process acquires a flow velocity output signal by sampling the portion of digital detection signal s7 corresponding to the flat portion of the detection signal s4 in the positive excitation section and to the flat portion of the detection signal s4 in the negative excitation section based on the first sampling signal s5. In addition, the flow rate calculation process obtains the flow rate of the fluid from the flow velocity output signal.

The abnormality judging process acquires a differential output signal by sampling the portion of digital detection signal s7 corresponding to the rising portion of the detection signal s4 in the positive exciting section and to the falling portion of the detection signal s4 in the negative excitation section based on the second sampling signal s6. The differential output signal contains a differential noise and the flow velocity output signal ingredient. Furthermore, the abnormality judging process obtains a differential noise from the flow velocity output signal and the differential output signal, detects abnormalities of the exciting current using the differential noise, and judges a failure part of the exciting circuit unit 13. In addition, the calculation unit 26 memorizes detection threshold levels of abnormalities in order to detect the abnormalities of the exciting current. Details of the differential noise and the detection threshold levels for the abnormalities are mentioned later.

The flow rate output circuit 27 outputs the flow rate of the fluid obtained by the calculation unit 26. In addition, the alarm output circuit 28 emits alarm which shows the abnormalities of the exciting current.

The detector 1 is provided with the exciting circuit 13-2 in FIG. 1. However, the converter 2 may be provided with the exciting circuit 13-2, and the exciting coil 13-1 may be connected to the exciting circuit 13-2 by a cable.

A purpose of the abnormality judging process of the exciting current is to judge which part is broken down among each part which constitutes the exciting circuit unit 13.

Figure 2:
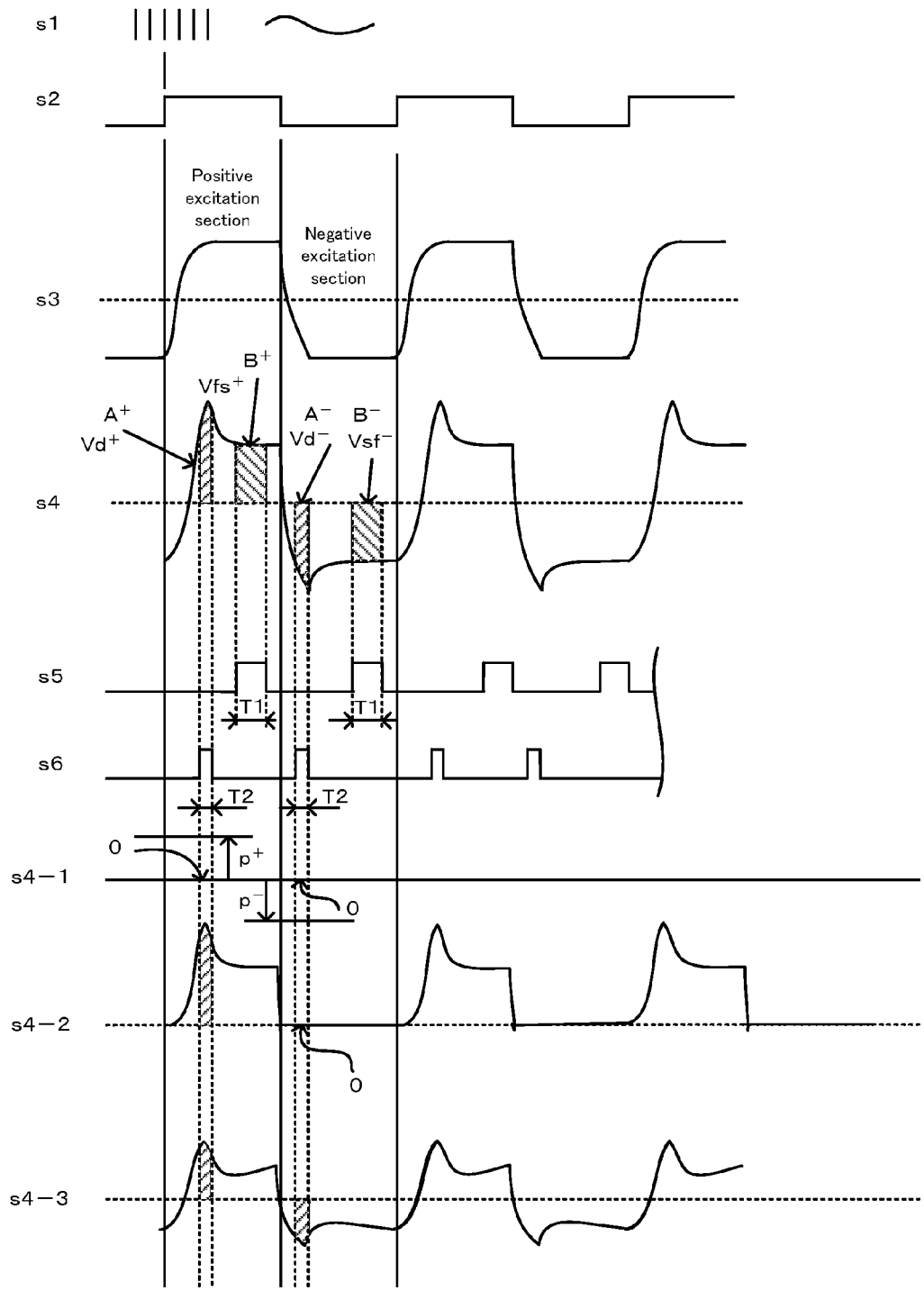
FIG. 2 is a timing chart explaining a signal processing operation of the first embodiment.

Next, with reference to FIG. 2, an operation of the electromagnetic flowmeter 100 constituted thus is explained. The signal of each part shown in FIG. 1 corresponds to the signal shown in the timing chart of FIG. 2.

In FIG. 2, the s1 indicates the clock signal which the timing signal control circuit 24 outputs. The s2 indicates the exciting synchronization signal which the timing signal control circuit 24 outputs. The s3 indicates the exciting current which flows into the exciting coil 13. Here, in the exciting synchronization signal s2, a section where a pulse is outputted is the positive excitation section, and a section where the pulse is not outputted is the negative excitation section. The s4 indicates the detection signal which the differential amplifier 21 outputs. The s5 indicates the first sampling signal which the timing signal control circuit 24 outputs. The s6 indicates the second sampling signal which the timing signal control circuit 24 outputs. The s4-1, the s4-2, and the s4-3 indicate the detection signals which the differential amplifier 21 outputs when the exciting current is unusual, respectively.

The timing signal control circuit 24 generates the clock signal s1, and supplies the clock signal s1 to the analog-digital converter 22 and the calculation unit 26. In addition, the timing signal control circuit 24 supplies the exciting synchronization signal s2 of a frequency set up beforehand to the exciting circuit 13-2.

The exciting circuit 13-2 sends through the exciting coil 13-1 the square wave exciting current s3 for generating the magnetic flux of the intensity set up beforehand in synchronization with the exciting synchronization signal s2. The exciting circuit 13-2 is provided with a constant current circuit (not shown) which generates a constant current and a changeover switch (not shown) which reverses a direction of this constant current. The exciting circuit 13-2 generates the square wave exciting current s3 of a symmetrical value in positive/negative.

At this time, a waveform of the exciting current s3 which flows into the exciting coil 13-1 becomes blunt in a rising portion and in a falling portion where the direction of the exciting current reverses. The detection signal s4 is generated based on this exciting current s3 and is outputted from the differential amplifier 21. The detection signal s4 contains a differential noise produced by differentiating the magnetic field in a part where the exciting current reverses.

The first embodiment extracts the differential noise from the detection signal s4 by the 2-level excitation of positive/negative, detects the abnormality of the exciting current using the differential noise, and judges an abnormality part of the exciting circuit unit 3. Hereinafter, the details of an operation are explained.

In FIG. 2, the signal s5 shows the first sampling signal for obtaining the flow rate of the fluid from the digital detection signal s7 based on the detection signal s4, and the signal s6 shows the second sampling signal for obtaining the differential noise from the digital detection signal s7 based on the detection signal s4.

The timing signal control circuit 24 generates individually the first sampling signal s5 and the second sampling signal s6. The timing signal control circuit 24, however, may generate the first sampling signal s5 and the second sampling signal s6 as single time series signal. In this case, a signal acquired by sampling the digital detection signal s7 is memorized by a memory of the calculation unit 26 which is not illustrated, in a manner that the positive excitation and the negative excitation are discriminated for every the first sampling signal s5 and the second sampling signal s6.

In the first sampling signal s5, a sampling section T1 is beforehand set up as a detection range for the flow velocity output signal. The sampling section T1 corresponds to the flat portion B+ of the detection signal s4 in the positive excitation section and to the flat portion B− of the detection signal s4 in the negative excitation section where the differential noise is ignorable. In addition, in the second sampling signal s6, a sampling section T2 is beforehand set up as a detection range for the differential output signal. A section which captures the feature of a differential noise waveform is set up as the sampling section T2. The sampling section T2 corresponds to the rising portion A+ of the detection signal s4 in the positive excitation section and to the falling portion A− of the detection signal s4 in the negative excitation section.

The calculation unit 26 samples the digital detection signal s7 in the sampling section T2 of the second sampling signal s6, and acquires the differential output signal Vd+. In addition, the calculation unit 26 samples the digital detection signal s7 in the sampling section T1 of the first sampling signal s5, and acquires the flow velocity output signal Vfs+. Then, the calculation unit 26 obtains the differential noise Vn+ by removing a flow velocity output signal ingredient Vsfd+ from the differential output signal Vd+, and judges the abnormality of the positive excitation current based on the differential noise Vn+. Since a case of the negative excitation current is the same as the case of the positive excitation current, the explanation of the case of the negative excitation current is omitted.

Next, how to obtain the differential noise is explained with reference to FIG. 3. FIG. 3 shows the relation among the square wave exciting current s3, the detection signal s4, the first sampling signal s5 and the second sampling signal s6 by a timing chart like FIG. 2.

Figure 3:
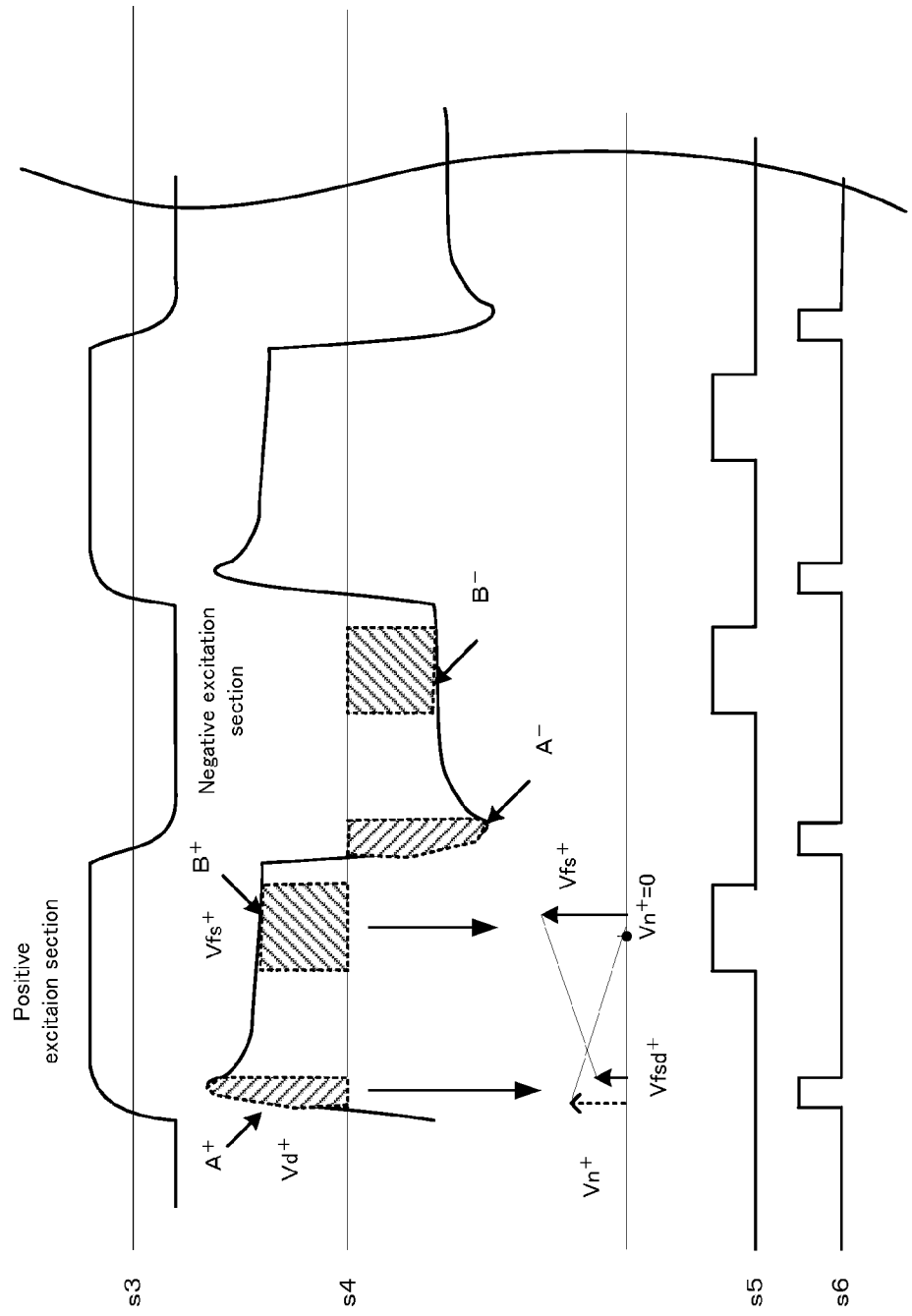
FIG. 3 is a timing chart explaining a processing operation which obtains a differential noise.

As shown in FIG. 3, the flow velocity output signal Vsf+ of the flat portion B+ of the detection signal s4 in the positive excitation section is acquired in the sampling section T1 of the first sampling signal s5.

The differential output signal Vd+ of the rising portion A+ of the detection signal s4 in the positive excitation section is acquired in the sampling section T2 of the second sampling signal s6.

The sampling section T2 should just be a range which captures the feature of the differential waveform of the rising portion. When two or more samplings are performed in each of the sampling section T1 and the sampling section T2, the flow velocity output signal Vsf+ and the differential output signal Vd+ are obtained as an average value of each section. For this reason, a length of the sampling section T1 and a length of the sampling section T2 may be different values each other. However, in the positive excitation section and in the negative excitation section, the sampling section T1 is set as the same length, respectively, and the sampling section T2 is set as the same length, respectively.

When it is assumed that the flow velocity output signal ingredient contained in the differential output signal Vd+ is Vfsd+, the differential noise Vn+ will be obtained from a following formula (1).

$$Vn+ = Vd+ - Vfsd+ \tag{1}$$

The flow velocity output signal ingredient Vfsd+ contained in the differential output signal Vd+ and the flow velocity output signal Vfs+ of the flat portion are in proportionality relation. When a proportionality factor is set to k, the flow velocity output signal ingredient Vfsd+ will be obtained by $$Vfsd+ = k \times Vfs+.$$

Therefore, the formula (1) becomes Vn+=Vd+−(k×Vfs+).

This proportionality factor k is constant and does not depend on the kind of fluid and the flow rate of fluid. The proportionality factor k becomes settled uniquely according to the detection structure which detects the voltage between electrodes 12 of the detector 1 of the electromagnetic flowmeter 100.

Namely, if a geometric shape of a loop, which is formed by a space between the electrodes 12 which the exciting magnetic flux intersects and the wiring which connects the electrode 12 and the differential amplifier 21, and the exciting current waveform (value) do not change, the ratio of the flow velocity output signal ingredient Vfsd+ contained in the differential output signal Vd+ in the rising portion of the positive excitation to the flow velocity output signal Vfs+ is constant.

When the flow velocity of the fluid is zero, since the flow velocity output signal ingredient Vfsd+ becomes zero, the formula (1) becomes Vn+=Vd+. Therefore, the proportionality factor k can be accurately obtained by measurement for every detector from the differential output signal Vd+ at the flow velocity zero and the flow velocity output signal Vfs+ and the differential output signal Vd+ at a certain flow velocity.

The differential noise Vn+ and the differential noise Vn− are obtained individually in a similar manner in the positive excitation section and in the negative excitation section. The differential noise Vn+ value and the differential noise Vn− value are memorized individually.

Next, the abnormality judging process of the exciting circuit unit 13 is explained with reference to FIG. 2.

The calculation unit 26 acquires the positive (negative) differential output signal Vd+ (Vd−) by sampling the digital detection signal s7 in the sampling section T2 of the second sampling signal s6. In addition, the calculation unit 26 acquires the positive (negative) flow velocity output signal Vfs+ (Vfs−) by sampling the digital detection signal s7 in the sampling section T1 of the first sampling signal s5.

The calculation unit 26 obtains the differential noise Vn+ (Vn−) from the proportionality factor k, the differential output signal Vd+ (Vd−) and the flow velocity output signal Vfs+ (Vfs−) using the formula (1). Furthermore, the calculation unit 26 obtains the flow rate of the fluid from the flow velocity output signal Vfs+ (Vfs−).

In calculation of the differential noise Vn+ (Vn−), as the differential output signal Vd+ (Vd−), an average value of sampled values is usually used. However, a peak value of the sampled values may be used when judgment accuracy of the abnormality of the differential noise is not required. As the flow velocity output signal Vfs+ (Vfs−), an average value of positive (negative) sampled values is usually used.

In order to judge the failure part of the exciting circuit unit 13, the differential noise is independently obtained in the positive excitation section and in the negative excitation section. The detection threshold level which is used for judging the existence of the failure part, is set for the positive excitation section and the negative excitation section. An absolute value of the detection threshold level for the positive excitation section is same as an absolute value of the detection threshold level for the negative excitation section.

Next, failure patterns of the exciting circuit unit 3 and the judgment operation for them are explained. As the failure patterns of the exciting circuit unit 13, three explained below can be considered. However, plural failure patterns may overlap in fact. The differential noise in the positive/negative excitation section is compared with the detection threshold level of the positive/negative set up beforehand, respectively in the judgment of each failure pattern.

In a first failure pattern, the cable which connects the exciting circuit 13-2 and the exciting coil 13-1 is disconnected and the exciting current does not flow. That is, the loop of the exciting current is opened.

In this case, the detection signal s4 is zero in the positive/negative excitation section, as shown in s4-1 in FIG. 2. The differential noise is zero in the positive/negative excitation section. The differential noise Vn+ in the positive excitation section is compared with a detection threshold level p+ of disconnection in the positive excitation section. An absolute value of the differential noise Vn− in the negative excitation section is compared with an absolute value of a detection threshold level p− of disconnection in the negative excitation section. The differential noise Vn+ is smaller than the detection threshold level p+ and the absolute value of the differential noise Vn− is smaller than the absolute value of the detection threshold level p−. Accordingly, the abnormality in the exciting current is detected. In this judgment operation, disconnection of the exciting coil 13-1, a cable, etc. can be judged.

In a second failure pattern, the changeover switch (not shown), which changes a direction of the exciting current of the exciting circuit 13-2, breaks down, and the exciting current flows only into one way.

In this case, the detection signal s4 appears in either the positive excitation section or the negative excitation section like s4-2 in FIG. 2. Accordingly, the differential noise is detected in either the positive excitation section or the negative excitation section. In the case of s4-2, the differential noise Vn+ of a predetermined value is obtained in the positive excitation section, and the differential noise Vn− of zero is obtained in the negative excitation section. The differential noise Vn+ is compared with a detection threshold level m+ (not shown) of abnormality in positive excitation. An absolute value of the differential noise Vn− is compared with an absolute value of a detection threshold level m− (not shown) of abnormality in negative excitation. The differential noise Vn+ exceeds the detection threshold level m+, and the absolute value of the differential noise Vn− is below the absolute value of the detection threshold level m−. Accordingly, the abnormality in negative excitation is detected. In this judgment operation, failure of the changeover switch, which changes the direction of the exciting current sent to the exciting coil 13-1 from the exciting circuit 13-2, can be judged.

In a third failure pattern, there is a loose connection etc. of one connection place of a loop through which the exciting current flows, a direct-current resistance of the loop increases, and thereby the exciting current decreases.

In this case, a level of the detection signal s4 becomes low like s4-3 in FIG. 2. As for the case of s4-3, the differential noise Vn+ in the positive excitation section is compared with a detection threshold level n+ (not shown) of abnormality in exciting intensity in positive excitation. The absolute value of the differential noise Vn− in the negative excitation section is compared with an absolute value of a detection threshold level n− (not shown) of abnormality in negative excitation. The differential noise Vn+ is not larger than the detection threshold level n+, and the absolute value of the differential noise Vn− is not larger than the absolute value of the detection threshold level n−. Accordingly, the abnormality in exciting intensity is detected. This judgment operation can judge existence of the loose connection in the loop.

As for the detection threshold levels of abnormalities, in the above explanation, different values are set up beforehand according to the failure patterns, respectively. However, the detection threshold level for disconnection and the detection threshold level for abnormality in exciting may use the same detection threshold level.

According to the embodiment, since the accurate differential noise is obtained, the abnormality judging can detect a slight change of the differential noise and can also judge the omen of the failure.

The abnormality judging does not need to be performed for every exciting cycle in positive/negative each time, and should just be performed with a cycle corresponding to variation with time of the failure pattern of the exciting current.

As explained above, this embodiment executes the flow rate calculation process which obtains the flow rate of the fluid and the abnormality judging process which judges the failure part of the exciting circuit unit at the same time. Here, "at the same time" means that the sampling of the digital detection signal for acquiring the flow velocity output signal and the sampling of the digital detection signal for acquiring the differential output signal are executed in the same positive excitation section or the same negative excitation section. That is, the sampling of the digital detection signal for acquiring the flow velocity output signal and the sampling of the digital detection signal for acquiring the differential output signal are executed in the same exciting section. Since the abnormality judging process is executed during measurement of the flow rate according to this embodiment, it is not necessary to stop measurement of the flow rate for the abnormality judging process.

This embodiment obtains the differential noise by removing the flow velocity output signal ingredient from the differential output signal, and judges the abnormality part of the exciting circuit unit by comparing the differential noise in the positive/negative section with the detection threshold level in positive/negative, respectively.

Therefore, according to this embodiment, the abnormality in the exciting current can be detected with sufficient accuracy, without adding new composition. Accordingly, this embodiment can provide the electromagnetic flowmeter which can perform easily the judgment of the abnormalities of the exciting circuit unit and the judgment of the failure patterns, and can provide the self-diagnosing method of the exciting circuit unit.

Second Embodiment

Figure 4:
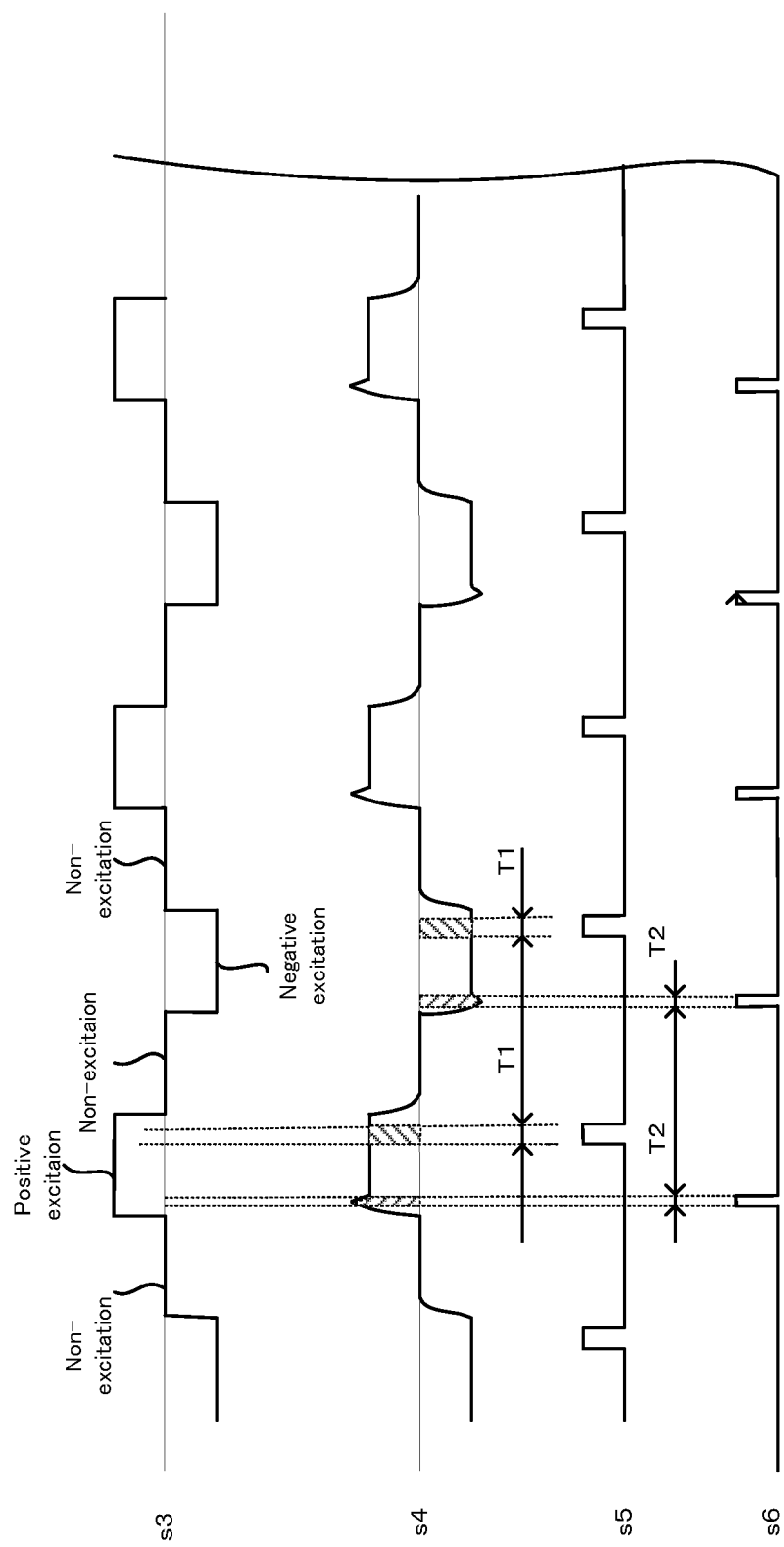
FIG. 4 is a timing chart explaining a signal processing operation of a second embodiment.

Next, the second embodiment is described with reference to FIG. 4. In second embodiment, the same numerals are given to the same portion as first embodiment, and an explanation thereof is omitted. A point that the second embodiment differs from the first embodiment is the following. In first embodiment, the 2-level excitation method which uses the square wave exciting current of positive/ negative is used. However, in the second embodiment, a 3-level excitation method using the square wave exciting current having an non-excitation section between the positive excitation section and the negative excitation section is used.

This 3-level excitation method can be realized easily by changing the control of the exciting circuit 13-2 and providing the non-excitation section.

The non-excitation section exists in the 3-level excitation. However, as shown in FIG. 4, in the 3-level excitation, the same processes as the flow rate calculation process and the abnormality judging process in the first embodiment, can be performed. Also in the case of excitation like the remaining magnetism excitation method with which the non-excitation section is provided intermittently, the same processing as a processing by the first embodiment is possible.

This embodiment obtains the differential noise by moving the flow velocity output signal ingredient from a differential output signal, and detects the abnormalities in the exciting current by comparing the differential noise in the positive excitation section with the detection threshold levels for the positive excitation section and comparing the differential noise in the negative excitation section with the detection threshold levels for the negative excitation section. Therefore, this embodiment can perform the abnormality detection of the exciting current with sufficient accuracy without adding new composition. This embodiment can provide the electromagnetic flowmeter which can perform easily the abnormality detection of the exciting current and which can perform the judgment of the failure part of the exciting circuit unit, and can provide the self-diagnosing method of the exciting circuit unit. Furthermore, according to this embodiment, since a abnormality judging process is executed during measurement of the flow rate of the fluid, it is not necessary to stop measurement of the flow rate for the abnormality judging process.

The excitation method of the electromagnetic flowmeter according to at lest one embodiment is not limited to a specific square wave excitation method. The 2-level excitation method, the 3-level excitation method, etc. are available for the invention.

According to at least one embodiment described above, the electromagnetic flowmeter which can perform the abnormality detection of the exciting current with sufficient accuracy, without adding new composition and the self-diagnosing method of the exciting circuit unit can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electromagnetic flowmeter which applies a magnetic field to a fluid in a measurement pipe, which processes a detection signal based on a voltage that is generated between a pair of electrodes which are arranged in the measurement pipe in a direction that intersects perpendicularly to an application direction of the magnetic field and that intersects perpendicularly to a tube axis of the measurement pipe, and which obtains a flow rate of the fluid, the electromagnetic flowmeter comprising:

an exciting circuit unit which includes an exciting coil to generate the magnetic field and an exciting circuit to send a square wave exciting current through the exciting coil;

a differential amplifier which detects the voltage generated between the pair of electrodes and which outputs the detection signal;

an analog-digital converter which changes the detection signal from the differential amplifier into a digital signal and outputs a digital detection signal;

a timing control circuit which generates an exciting synchronization signal for the exciting circuit unit, a first sampling signal for sampling a portion of the digital detection signal corresponding to a flat portion of the detection signal in a positive excitation section and to a flat portion of the detection signal in a negative excitation section, and a second sampling signal for sampling a portion of the digital detection signal corresponding to a rising portion of the detection signal in the positive excitation section and to a falling portion of the detection signal in the negative excitation section; and a calculation unit to execute:
  a flow rate calculation process which acquires a flow velocity signal by sampling the digital detection signal based on the first sampling signal and obtains the flow rate of the fluid from the flow velocity signal; and
  an abnormality judging process which acquires a differential signal containing a differential noise and a flow velocity signal component by sampling the digital detection signal based on the second sampling signal, obtains the flow velocity signal component by multiplying the flow velocity signal by a predetermined proportionality factor, obtains the differential noise by subtracting the obtained flow velocity signal component from the differential signal, detects abnormality of the exciting current by comparing the differential noise with a detection threshold level, and judges a failure part of the exciting circuit unit based on the differential noise;

wherein the calculation unit executes the flow rate calculation process and the abnormality judging process at a same time.

2. The electromagnetic flowmeter according to claim 1, wherein plural detection threshold levels are set up corresponding to plural failure patterns, respectively.

3. A self-diagnosing method of an exciting circuit unit of an electromagnetic flowmeter which comprises the exciting circuit unit including an exciting coil to generate a magnetic field and an exciting circuit to send a square wave exciting current through the exciting coil, wherein the electromagnetic flowmeter applies the magnetic field to a fluid in a measurement pipe, processes a detection signal based on a voltage generated between a pair of electrodes arranged in the measurement pipe in a direction that intersects perpendicularly to an application direction of the magnetic field and that intersects perpendicularly to a tube axis of the measurement pipe, and obtains a flow rate of the fluid; the self-diagnosing method of the exciting circuit unit comprising:

generating the detection signal by amplifying the voltage generated between the pair of electrodes;

generating a digital detection signal by changing the detection signal into a digital signal;

obtaining the flow rate of the fluid by acquiring a flow velocity signal by sampling a portion of the digital detection signal corresponding to a flat portion of the detection signal in a positive excitation section by the exciting current and to a flat portion of the detection signal in a negative excitation section by the exciting current;

acquiring a differential signal by sampling a portion of the digital detection signal corresponding to a rising portion of the detection signal in the positive excitation section and to a falling portion of the detection signal in the negative excitation section;

obtaining a flow velocity signal component which is contained in the differential signal by multiplying the flow velocity signal by a predetermined proportionality factor k;

obtaining a differential noise by subtracting the flow velocity signal component from the differential signal; and judging a failure part of the exciting circuit unit by detecting abnormality in the exciting current by comparing the obtained differential noise with a predetermined detection threshold level.

* * * * *